US010214210B2

United States Patent
John

(10) Patent No.: US 10,214,210 B2
(45) Date of Patent: Feb. 26, 2019

(54) VEHICLE GEAR TRANSITION DURING BRAKING EVENT

(71) Applicant: Bendix Commercial Vehicle Systems LLC, Elyria, OH (US)

(72) Inventor: Mathew J John, Avon, OH (US)

(73) Assignee: Bendix Commercial Vehicle Systems LLC, Elyria, OH (US)

( * ) Notice: Subject to any disclaimer, the term of this patent is extended or adjusted under 35 U.S.C. 154(b) by 3 days.

(21) Appl. No.: 15/616,259

(22) Filed: Jun. 7, 2017

(65) Prior Publication Data

US 2018/0354514 A1 Dec. 13, 2018

(51) Int. Cl.
*B60W 30/08* (2012.01)
*B60W 30/14* (2006.01)
*B60W 50/04* (2006.01)
*B60W 30/184* (2012.01)

(52) U.S. Cl.
CPC .......... *B60W 30/143* (2013.01); *B60W 30/08* (2013.01); *B60W 30/184* (2013.01); *B60W 50/045* (2013.01)

(58) Field of Classification Search
CPC ...... B60W 10/06; B60W 10/11; B60W 10/18; B60W 30/08; B60W 30/143
See application file for complete search history.

(56) References Cited

U.S. PATENT DOCUMENTS

| 4,632,079 | A | 12/1986 | Panizza | |
|---|---|---|---|---|
| 5,477,456 | A | 12/1995 | Fennel | |
| 7,211,026 | B2 | 5/2007 | Berger | |
| 9,074,571 | B1 | 7/2015 | Malone | |
| 2007/0010929 | A1 | 1/2007 | Takeda | |
| 2007/0219695 | A1* | 9/2007 | Chiu | B60W 30/08 701/51 |
| 2009/0018757 | A1 | 1/2009 | Kobayashi | |
| 2014/0095038 | A1 | 4/2014 | Breu | |
| 2015/0165905 | A1* | 6/2015 | Filev | B60K 31/00 701/94 |
| 2015/0239470 | A1* | 8/2015 | Rindfleisch | B60W 10/06 701/110 |

OTHER PUBLICATIONS

Bendix Commercial Vehicle Systems LLC, "Bendix Wingman Fusion Driver Assistance System," Service Data Sheet SD-61-4963, Jul. 2016, 84 pages, Bendix Commercial Vehicle Systems LLC, Elyria Ohio, United States of America.
Bendix Commercial Vehicle Systems LLC, 'Bendix ESP EC-80 Controller, Service Data Sheet SD-13-4986, Jul. 2015, 64 pages, Bendix Commercial Vehicle Systems LLC, Elyria Ohio, United States of America.

* cited by examiner

*Primary Examiner* — Edwin A Young
(74) *Attorney, Agent, or Firm* — Cheryl L. Greenly; Brian E. Kondas; Eugene E. Clair

(57) ABSTRACT

An apparatus for a host vehicle comprises an input for receiving a signal indicative of a target object, an output for transmitting at least one of an acceleration message, an engine control message and a transmission control message and a processor having control logic. The control logic transmits the acceleration message to request a negative acceleration of a host vehicle in response to a signal indicating a detected target object in order to maintain a predetermined following time behind the detected target object and transmits a transmission control message to request the transmission to shift to neutral in response to the negative acceleration having a value less than a predetermined negative acceleration value.

13 Claims, 2 Drawing Sheets

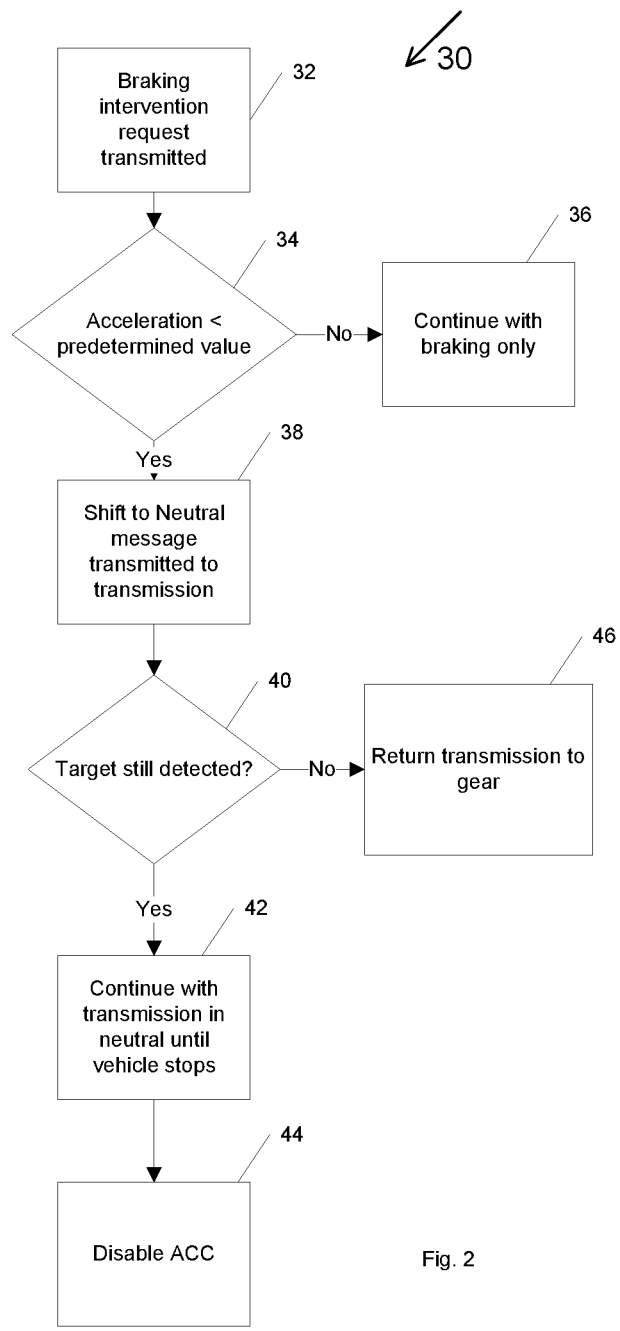

VEHICLE GEAR TRANSITION DURING BRAKING EVENT

BACKGROUND

The present invention relates to embodiments of an adaptive cruise control system that requests a transmission gear transition during certain automated braking events. An adaptive cruise control system may request an automated braking event to maintain a predetermined time gap behind a target vehicle. In situations where the target vehicle may slow abruptly, an intense braking intervention may be requested by the adaptive cruise control system. In some situations, the intense braking intervention may cause the engine to stall as the vehicle speed drops quickly. There is a desire to be able to safely decelerate the vehicle during an adaptive cruise control automated braking event without causing damage to the engine and transmission.

SUMMARY

Various embodiments of an adaptive cruise controller for a commercial host vehicle comprise an input for receiving a signal indicative of a target object; an output for transmitting at least one of an acceleration message an engine control message and a transmission control message; and a processor having control logic. The control logic transmits the acceleration message to request a negative acceleration of a host vehicle in response to a signal indicating a detected target object in order to maintain a predetermined following time behind the detected target object; and transmits a transmission control message to request the transmission to shift to neutral in response to the negative acceleration having a value less than a predetermined negative acceleration value.

In accordance with another aspect, a method for controlling a host vehicle having an adaptive cruise control system comprises receiving a signal indicative of a target object; transmitting an acceleration message to request a negative acceleration to at least one of an engine controller, a retarder and a brake controller to maintain the vehicle at a predetermined following time from the target object upon receiving the signal indicative of a target object; and transmitting a transmission control message to a transmission to set the transmission in neutral in response to the acceleration message having a value less than a predetermined acceleration value.

BRIEF DESCRIPTION OF THE DRAWINGS

In the accompanying drawings which are incorporated in and constitute a part of the specification, embodiments of the invention are illustrated, which, together with a general description of the invention given above, and the detailed description given below, serve to exemplify the embodiments of this invention.

FIG. 2 illustrates a method of controlling a vehicle having an adaptive cruise control system according to one example of the invention.

DETAILED DESCRIPTION

Figure 1:
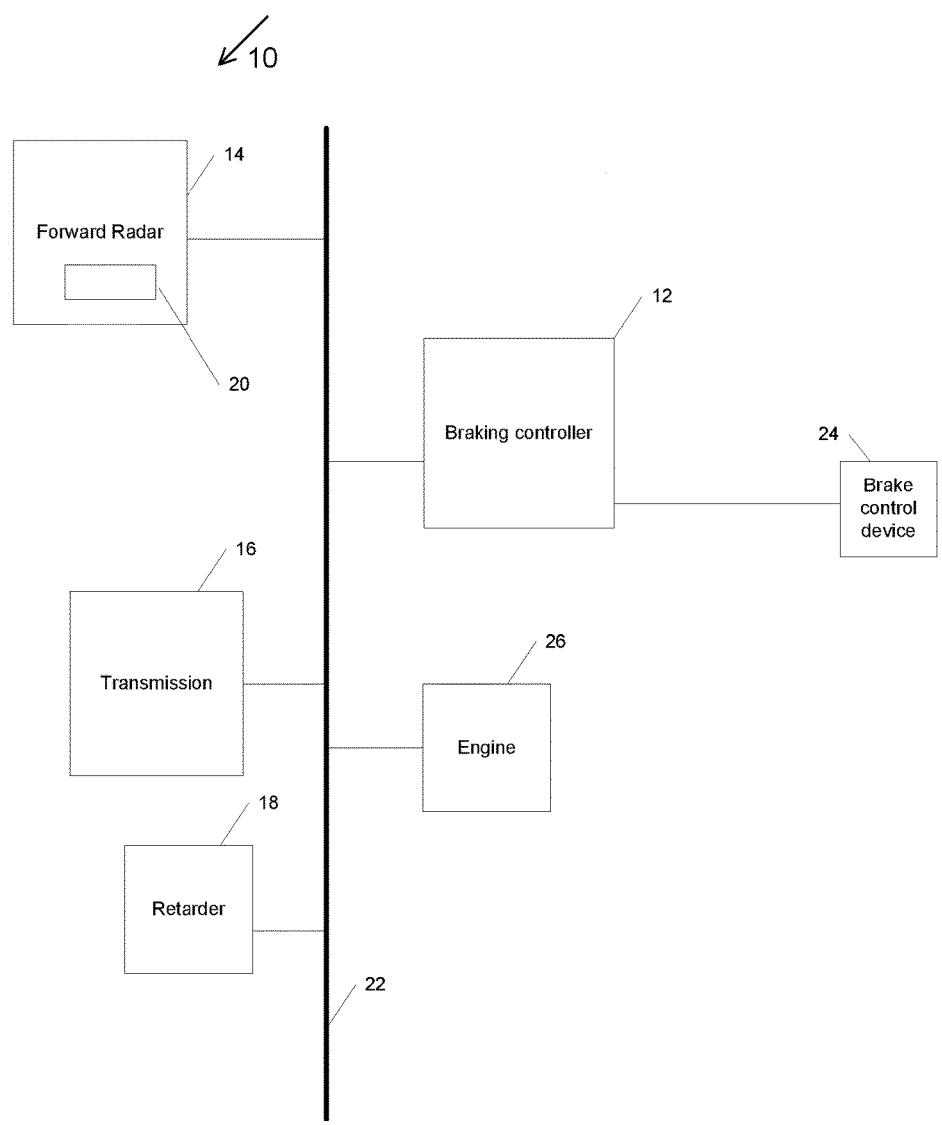
FIG. 1 illustrates vehicle system having an adaptive cruise control system according to one example of the invention.

FIG. 1 illustrates an adaptive cruise control system (ACC) 10 as would be installed on a host vehicle. The ACC 10 includes a radar controller 14. The radar controller 14 transmits and receives radar signals, which are electromagnetic waves used to detect an object's presence, longitudinal distance, lateral distance, speed and direction with respect to the host vehicle. The radar controller 14 can detect multiple stationary or moving objects within a wide range to the front and sides of the host vehicle. The radar and control functions may be in a single controller or the radar function may be in a separate sensing device. The radar controller 14 may be of the type used in the Bendix® Wingman® Fusion™ Driver Assistance System from Bendix Commercial Vehicle Systems LLC of Elyria Ohio. Other sensors that can detect target vehicles are contemplated, such as cameras and LIDAR.

The radar controller 14 includes a processor with control logic 20 having inputs for receiving and outputs for transmitting messages to control the ACC 10. The control logic 20 may include volatile, non-volatile memory, solid state memory, flash memory, random-access memory (RAM), read-only memory (ROM), electronic erasable programmable read-only memory (EEPROM), variants of the foregoing memory types, combinations thereof, and/or any other type(s) of memory suitable for providing the described functionality and/or storing computer-executable instructions for execution by the control logic 20.

The control logic 20 may include an adaptive cruise control algorithm configurable in a speed mode, a time gap mode or a following distance mode. The longitudinal distance, lateral distance and relative velocity of the target vehicle with respect to the host vehicle is continually monitored. In one example, when the calculated time to a target vehicle is less than a preset time gap, a following alert is transmitted as a threat of a possible collision with the target vehicle exists. When certain limits are breached, the control logic 20 may also intervene automatically by transmitting messages to decelerate the vehicle in order to maintain the preset time gap. The control logic 20 may also intervene automatically by transmitting messages to accelerate the vehicle in order to maintain the preset time gap behind the target vehicle or to maintain the desired vehicle speed in the absence of a target vehicle.

The ACC 10 communicates with other controllers on the host vehicle using a public vehicle communications bus 22. The radar controller 14 may transmit braking control messages, acceleration messages and transmission control messages on the vehicle communications bus 22 when executing the adaptive cruise control algorithm of the present invention. The radar controller 14 can also transmit a braking activity indicator, a distance to the detected object and a status signal to the vehicle communications bus 22.

A braking system controller 12 communicates with the ACC 10 via the vehicle communications bus 22. The braking system controller 12 receives braking control messages and controls the service brakes of the host vehicle. The braking system controller 12 may also communicate the speed of the host vehicle on the vehicle communications bus 22. The braking system controller 12 includes an output for communicating with at least one brake control device 24. The brake control device 24 may be an electro-pneumatic device that provides air to the service brakes on a wheel end in response to control signals from the braking system controller 12 when the host vehicle is an air-braked commercial vehicle. The braking system controller 12 may be of the type used in the Bendix® ABS-6 Advanced with ESP® System from Bendix Commercial Vehicle Systems of Elyria Ohio.

A transmission controller 16 communicates with the ACC 10 via the vehicle communications bus 22. The transmission controller 16 receives transmission control messages regarding requested vehicle gear downshifts and upshifts and will change the operating gear of the transmission accordingly. The transmission of the host vehicle may be an automated manual transmission that responds both to the automated shift requests and driver shift requests.

A retarder 18 communicates with the ACC 10 via the vehicle communications bus 22. The retarder 18 receives deceleration messages and assists in slowing the host vehicle by changing the engine operation in response to the deceleration messages.

An engine controller 26 communicates with the ACC 10, the transmission controller 16 and the retarder 18 via the vehicle communications bus 22. The engine controller 26 receives deceleration messages and slows the vehicle in response. The engine controller 26 also receives torque request messages and propels the vehicle in response. The engine controller 26 generally responds first to a message from the transmission controller 16 prior to responding to a message from the ACC 10. The engine controller 26 will cause the engine to disengage from the load of the vehicle when the transmission controller 16 sets the transmission to neutral. The engine controller 26 may also transmit the speed of the host vehicle on the vehicle communications bus 22.

When a target vehicle is detected, the ACC 10 transmits messages to one or more of the braking system controller 12, the retarder 18 and the engine controller 26 to maintain the host vehicle at a preset time gap (e.g., 3 seconds or the like) behind the target vehicle. The ACC 10 will also transmit messages to mitigate a collision if the longitudinal distance, lateral distance and relative velocity between the host vehicle and the target vehicle are less than predetermined limits. The message may be a negative acceleration message having a negative acceleration value that is less than a predetermined negative acceleration value. In that instance, the ACC 10 will also transmit a message to the transmission controller 16 to request the transmission be shifted to neutral.

Therefore, an apparatus for a host vehicle comprises an input for receiving a signal indicative of a target object, an output for transmitting at least one of an acceleration message, an engine control message and a transmission control message and a processor having control logic. The control logic transmits the acceleration message to request a negative acceleration of a host vehicle in response to a signal indicating a detected target object in order to maintain a predetermined following time behind the detected target object and transmits a transmission control message to request the transmission to shift to neutral in response to the negative acceleration having a value less than a predetermined negative acceleration value.

FIG. 2 illustrates a method 30 to control a vehicle having ACC 10 using both the service braking system and the transmission according to one example of the present invention. The method 30 begins with step 32, wherein the radar controller 14 determines that a braking intervention is necessary in order to maintain the preset time gap behind a target vehicle. The radar controller 14 will transmit an acceleration message having a negative acceleration request value on the vehicle communications bus 22.

In step 34, the negative acceleration request value is compared to a predetermined threshold negative acceleration value. In one example, the predetermined negative acceleration value is selected between −3 g and −4 g. If the acceleration request value is greater than or equal to the predetermined value, the method 30 continues with step 36 by continuing to transmit only the negative acceleration message, which is responded to by the retarder 18 and the braking controller 12 to slow the vehicle until the preset time gap is reached. In this instance, the risk of damage to the engine during the deceleration is not as great. If the negative acceleration request value is less than the predetermined value, the method 30 continues to step 38.

In step 38, the radar controller 14 will begin to transmit a neutral gear message on the vehicle communications bus 22. The neutral gear message will be received by the transmission controller 16 on the host vehicle. The transmission controller 16 will subsequently cause the transmission to change gears and shift to neutral immediately.

In step 40, the radar controller 14 determines if the target vehicle is still detected. If the target vehicle is no longer detected, the method 30 moves to step 46 where the neutral gear message is no longer transmitted. A positive torque request message may be transmitted if the host vehicle needs to return to the preset speed mode according to the driver's requested preset speed. The transmission controller 16 can then respond to the positive message with the appropriate gearing. Alternatively, the radar controller 14 transmits a transmission control request containing the appropriate gear based on the current speed of the host vehicle and other factors. This method 30 is advantageous as increasing the transmission gear from neutral is less damaging to the transmission and engine than trying the increase the host vehicle speed if the transmission had remained in a higher gear during the deceleration.

If the target vehicle is still detected in step 40, the neutral gear transmission message continues to be transmitted in step 42. The ACC 10 continues to transmit the braking control message until the vehicle is completely stopped. In step 44, ACC 10 may also be disabled.

With this method, the host vehicle will have a smoother deceleration and the driver will not feel a lurching motion as the braking is smoothly combined with the transmission shift to neutral gear. The engine will not suffer deleterious effects from the sudden deceleration.

Therefore, a method of controlling a host vehicle having an adaptive cruise control system comprises receiving a signal indicative of a target object and transmitting an acceleration message to request a negative acceleration to at least one of an engine controller, a retarder and a brake controller to maintain the vehicle at a predetermined following time from the target object upon receiving the signal indicative of a target object. The method includes transmitting a transmission control message to a transmission to set the transmission in neutral in response to the acceleration message having a value less than a predetermined acceleration value.

While the present invention has been illustrated by the description of embodiments thereof, and while the embodiments have been described in considerable detail, it is not the intention of the applicants to restrict or in any way limit the scope of the appended claims to such detail. Additional advantages and modifications will readily appear to those skilled in the art. Therefore, the invention, in its broader aspects, is not limited to the specific details, the representative apparatus, and illustrative examples shown and described. Accordingly, departures may be made from such details without departing from the spirit or scope of the applicant's general inventive concept.

I claim:

1. An adaptive cruise controller for a host vehicle comprising:

an input for receiving a signal indicative of a target vehicle;

an output for transmitting at least one of an acceleration message, an engine control message and a transmission control message; and a processor having control logic for:
- transmitting the acceleration message to request a negative acceleration of the host vehicle in response to a signal indicating a detected target vehicle in order to maintain a predetermined following time behind the detected target vehicle; and
- transmitting the transmission control message to request a transmission to shift to neutral in response to the negative acceleration having a value less than a predetermined negative acceleration value.

2. The adaptive cruise controller as in claim 1, wherein the control logic is further for transmitting the transmission control message to request the transmission to shift to an appropriate gear based on requested speed in response to a signal indicating the target vehicle is no longer detected.

3. The adaptive cruise controller as in claim 1, wherein the control logic is further for transmitting a positive torque request to return the host vehicle to a predetermined cruise control speed and discontinuing the transmission control message in response to a signal indicating the target vehicle is no longer detected.

4. The adaptive cruise controller as in claim 1, wherein the control logic is further for transmitting the acceleration message to request negative acceleration until the host vehicle is completely stopped while the target vehicle is present.

5. The adaptive cruise controller as in claim 1, wherein the predetermined negative acceleration value is between about −3 g and −4 g.

6. The adaptive cruise controller as in claim 1, wherein the output is in communication with a vehicle communications bus.

7. A method for controlling a host vehicle having an adaptive cruise control system comprising:
- receiving a signal indicative of a target vehicle;
- transmitting an acceleration message to request a negative acceleration to at least one of an engine controller, a retarder and a brake controller to maintain the vehicle at a predetermined following time from the target vehicle upon receiving the signal indicative of a target vehicle; and
- transmitting a transmission control message to a transmission to set the transmission in neutral in response to the acceleration message having a value less than a predetermined negative acceleration value.

8. The method as in claim 7, further comprising:
- transmitting the transmission control message to set the transmission in an appropriate gear in response to a signal indicating the target vehicle is no longer present.

9. The method as in claim 7, further comprising transmitting a positive torque request and discontinuing the transmission control message in response to the signal indicating the target vehicle is no longer detected.

10. The method as in claim 7, further comprising transmitting a positive torque request to return the host vehicle to a predetermined cruise control speed in response to the signal indicating the target vehicle is no longer detected.

11. The method as in claim 7, further comprising transmitting the acceleration message to request negative acceleration until the host vehicle is completely stopped.

12. The method as in claim 7, wherein the predetermined negative acceleration value is between about −3 g and −4 g.

13. An adaptive cruise controller for a commercial host vehicle comprising:
- an input for receiving a signal indicative of a target vehicle;
- an output for transmitting at least one of an acceleration message, an engine control message and a transmission control message; and
- means for transmitting the acceleration message to request a negative acceleration of the host vehicle in response to a signal indicating a detected target vehicle in order to maintain a predetermined following time behind the detected target vehicle; and
- means for transmitting the transmission control message to request a transmission to shift to neutral in response to the negative acceleration having a value less than a predetermined negative acceleration value.

* * * * *